US005822098A

United States Patent [19]

Morgaine

[11] Patent Number: 5,822,098

[45] Date of Patent: Oct. 13, 1998

[54] DEVICE AND METHOD OF COMMUNICATION BY INFRARED RADIATION BETWEEN A USER AND A REMOTELY CONTROLLABLE APPARATUS

[75] Inventor: Sylvain Morgaine, Paris, France

[73] Assignee: Metalogic, Paris, France

[21] Appl. No.: 565,026

[22] Filed: Nov. 30, 1995

[30] Foreign Application Priority Data

May 19, 1995 [FR] France .................................. 95 06006

[51] Int. Cl.[6] ...................................................... H04B 10/00

[52] U.S. Cl. .................... 359/142; 348/734; 340/825.72; 359/146

[58] Field of Search .................................... 359/142, 144, 359/146–147, 148, 174; 455/151.2; 348/734; 340/825.72

[56] References Cited

U.S. PATENT DOCUMENTS 5,519,457 5/1996 Nishigaki et al. ...................... 359/142

FOREIGN PATENT DOCUMENTS 0566516 10/1993 European Pat. Off. ............... 359/142
2 518 336 6/1983 France .
2 665 777 2/1992 France .
2 220 290 1/1990 United Kingdom .

OTHER PUBLICATIONS

Patent Abstracts of Japan, vol. 017, No. 362 (M–1441), 8 Jul. 1993 & JP–A–05 052415 (Matsushita Electric Ind Co Ltd), 2 Mar. 1993, * abstract *.

Patent Abstracts of Japan, vol. 017, No. 077 (M–1367), 16 Feb. 1993 & JP–A–04 278824 (Matsushita Electric Ind Co Ltd), 5 Oct. 1992, * abstract *.

*Primary Examiner*—Kinfe-Michael Negash
*Attorney, Agent, or Firm*—Larson & Taylor

[57] ABSTRACT

A device and a method of interfacing between a user and an apparatus which can be remotely controlled by infrared radiation are disclosed. The device receives infrared signals and includes at least one serial link. Infrared signals corresponding to the programmable apparatus are coded into ASCII and the infrared signals are stored in a read/write memory. The coded signals and/or stored data are processed in order to carry out a specified application. Several individual sensors located at a distance from the box, respectively connected in a removable manner and by cabled link to the box, are actuatable by the user and are capable of triggering the transmission of the infrared signals for remotely controlling the apparatus.

14 Claims, 2 Drawing Sheets

DEVICE AND METHOD OF COMMUNICATION BY INFRARED RADIATION BETWEEN A USER AND A REMOTELY CONTROLLABLE APPARATUS

FIELD OF THE INVENTION

The present invention relates to a device for interfacing between a user and an apparatus which can be remotely controlled by infrared radiation. The device includes a box comprising data storage means, means for remote control of the apparatus which are configured to transmit infrared signals on the basis of the stored data, and means of communicating with a unit for programming the means of remote control.

The invention also relates to a method of communication between a user and an apparatus which can be remotely controlled by infrared radiation via a programmable interfacing device.

The invention finds a particularly important, although not exclusive, application in the field of interactive outlets communicating by infrared radiation, or in the field of home automation.

BACKGROUND OF THE INVENTION

Devices or methods making it possible to render apparatuses or systems interactive by infrared radiation are already known. The latter have drawbacks. In fact, when such devices drive self-contained interactive apparatuses such as videodisc or CD-I players, CD-photos, CD-video, etc., they generally employ expensive and complex means such as for example a microcomputer whose function consists in gathering the signals, processing them via a computer program and then driving the apparatuses. This results, in particular, in minimizing uses of the device.

The object of the present invention is to provide a device and a method of communication which improve upon those previously known by offering greater flexibility of use and in employing inexpensive means which are easy to use by a non-specialist operator.

SUMMARY OF THE INVENTION

For this purpose, the invention proposes, in particular, a device for interfacing between a user and an apparatus which can be remotely controlled by infrared radiation, the device including a box of small size comprising:

- data storage means,
- means for remote control of the apparatus including means for transmitting infrared signals capable of controlling the apparatus on the basis of the stored data, and
- means of communicating with an external unit for programming the means of remote control. Preferably the means of communication comprise infrared signal reception means and at least one serial link. The means of remote control comprise means for processing the infrared signals corresponding to the remotely controllable apparatus which are capable of coding into ASCII and then of storing the infrared signals in a read/write memory and of processing the signals thus coded and/or the stored data in order to carry out a specified application with the apparatus.

Advantageously, the invention also proposes a device which includes several connection inputs and several individual sensors located some distance from the box, connected in a removable manner by cabled link to the respective connection inputs. The sensors may be actuated by the user and are capable of triggering the transmission of the infrared signals for remote control of the apparatus from the processing means, so that the specified application is carried out by the apparatus.

Advantageous embodiments include one or more of the following features:

- the sensors are capacitive keys;
- at least two sensors are connected in parallel to the same connection input;
- the sensors and the processing means are configured to control the transmission of ASCII signals via the serial link;
- the means for storing data corresponding to the infrared signals to be transmitted and the sensors are configured so as to be programmed in the form of character strings, so that the totality of instructions for remote control of the apparatus by the device is stored in a single read/write memory;
- at least one sensor is configured so as to trigger different transmissions of infrared signals depending on the previous action of the user on the sensor, and/or on one or more other sensors.

This amounts to bestowing several functions upon one and the same sensor. For example, if six different sensors relate respectively to a video recorder, a videodisc player and a CD player, as well as to the play, rewind and forward functions, previous pressing of the sensor of the apparatus which it is desired to control makes it possible, on contacting the function sensors, to dispatch the infrared signal for controlling the specific apparatus previously selected.

- at least one infrared signal can be triggered automatically, without any action being exerted on the sensors, in repetitive fashion in accordance with a specified interval.

The invention is also directed to an interactive system of communication comprising at least two devices of the type described above which are configured to interact with one another. Advantageously at least one of the sensors is connected to two different devices.

The invention further relates to a method of communication between a user and an apparatus which can be remotely controlled by infrared radiation via a programmable interfacing device, wherein the device is furnished with a box associated with several individual sensors located some distance from the box to which they are respectively connected in a removable manner. The infrared signals corresponding to the remotely controllable apparatus are coded into ASCII and the signals thus coded are stored in a memory of the device. Instructions for control of the apparatus corresponding to a specified application are stored in a memory of the device. With each sensor is associated the transmission by the device of infrared signals corresponding to the control instructions. The infrared transmission is controlled via one or more actions by the user on one or more of the sensors, so that the specified application is carried out.

Advantageously, the infrared signals are stored and instructions for control in the form of character strings are associated with the sensors, the totality of a specified application being stored in one and the same read/write memory.

In an advantageous embodiment the application is loaded into the device by CD-I, videodisc, CD-audio or video signal or the like.

Also advantageously, the method is used to communicate between at least two devices, or even four or five devices.

The invention will be better understood on reading the description which follows of an embodiment of the invention, given by way of non-limiting example.

BRIEF DESCRIPTION OF THE DRAWINGS

The description makes reference to the drawings which accompany it, in which.

DESCRIPTION OF THE PREFERRED EMBODIMENTS

Figure 1:
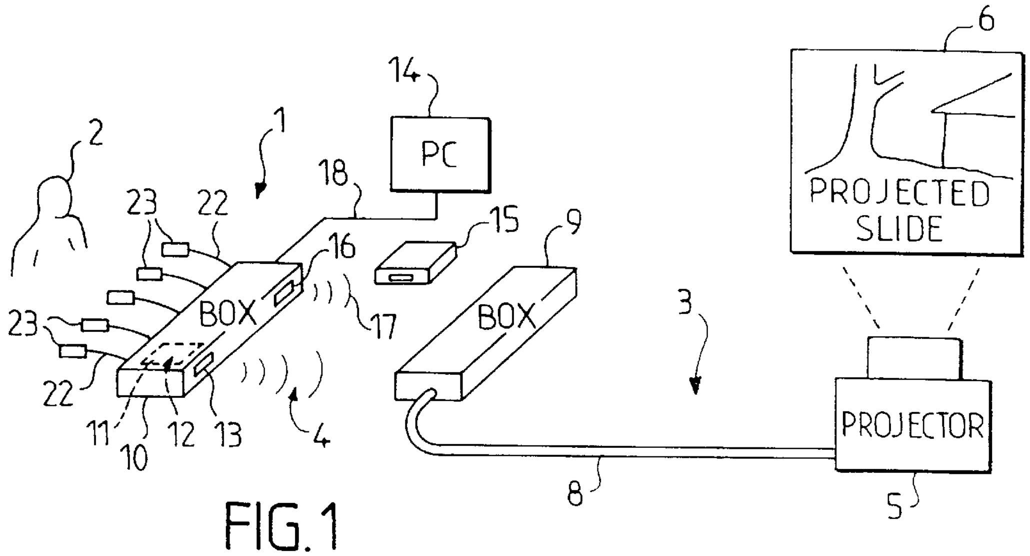
FIG. 1 is a basic diagram showing a system of devices according to the invention which is used to remotely control a slide projector.

FIG. 1 shows a device 1 for interfacing between a user 2 and an apparatus 3 which can be remotely controlled by infrared radiation 4.

In the embodiment described, the remotely controllable apparatus is a projector 5 of slides 6, which is connected via a serial link 8 to a box for receiving infrared radiation 9, which is for example similar to the box of the device 1.

The device 1 comprises a box 10 of small size for example a parallelepipedal metal box of 160 mm×280 mm×70 mm.

The box comprises a mother card furnished with data storage means 11 (see also FIG. 2), means 12 for remote control of the apparatus 5 including means 13 for transmitting infrared signals 4 based on stored data in a manner known per se, by light emitting diodes.

Means of communication with an external unit 14 (microcomputer) or 15 (IR transmitter) for programming the means 12 of remote control are provided.

They comprise means 16 for receiving infrared signals 17 known per se for example by opto-trigger, for learning sequences originating from the remote control box 15, and at least one RS232 type serial link 18, for example a 4800 baud 8 bit no-parity mini-din 8 3-wire Rx Tx and earth serial interface.

The remote control means 12 comprise means 19 for processing the infrared signals corresponding to the remotely controllable apparatus, here the slide projector. The means 19 for processing the infrared signals is capable of coding the infrared signals into ASCII and of storing them in a read/write memory 20 and of processing the signals thus coded and/or the stored data.

More precisely and for example the processing and storage means consist of a CMOS microprocessor from the 68 HC705 family, for example the 68 HC705PCDW CMOS microcontroller manufactured by the Motorola company clocked by a 4.9152 MHz quartz, the associated EEPROM type read/write memory capacity being 1K bytes, or even 2K bytes.

The device can operate with positive or negative logic and is electrically powered by battery (not represented) or from the mains.

The device includes several so-called female digital connection inputs 21 of the type known as "stereo mini-jacks" by those skilled in the art, for example five inputs, but advantageously more, for example twelve, twenty-four or thirty-six inputs.

A sensor 23 is connected to each input via a corresponding electrical cable 22, plugged into the "mini-jack" male plug, all the sensors being identical.

In one embodiment, the sensor can be converted into a dry contact for example by connecting one of the earths of the double cable of the "mini-jacks" to the contact wire (red cladding), the 5 volt supply wire being insulated.

The sensor can also be a sensor which can be actuated by sound (human voice) or a specified change in the physical environment of the sensor (humidity, smoke, etc.).

In the embodiment more particularly described here the sensors 23 consist of rectangular capacitive keys with small dimensions for example 2 cm×3 cm×0.5 cm.

One face of the key is in the form of a metal plate and constitutes an antenna making it possible to detect a substance containing liquid, such as the finger of a hand for example, contacting or distant by as much as a few centimeters, or via an intermediary electrically conducting element such as a metal object.

The metal plate can be embedded in a more or less thick material of the resin type so as to modify the sensitivity of the antenna.

An embodiment of this sensor is described, for example, in the document EP-A-070,126 using a capacitive sensor employing a Wien Bridge oscillator in which the antenna is connected to the positive feedback circuit of the oscillator.

The inputs 21 themselves are plugged into the bus 24, via a converter circuit 25 known per se, the bus 24 moreover allowing interactive plugging-in and operation in various elements of the card furnished as seen with the means 13, 16, 18, 19 and with the EEPROM memory 20.

Figure 2:
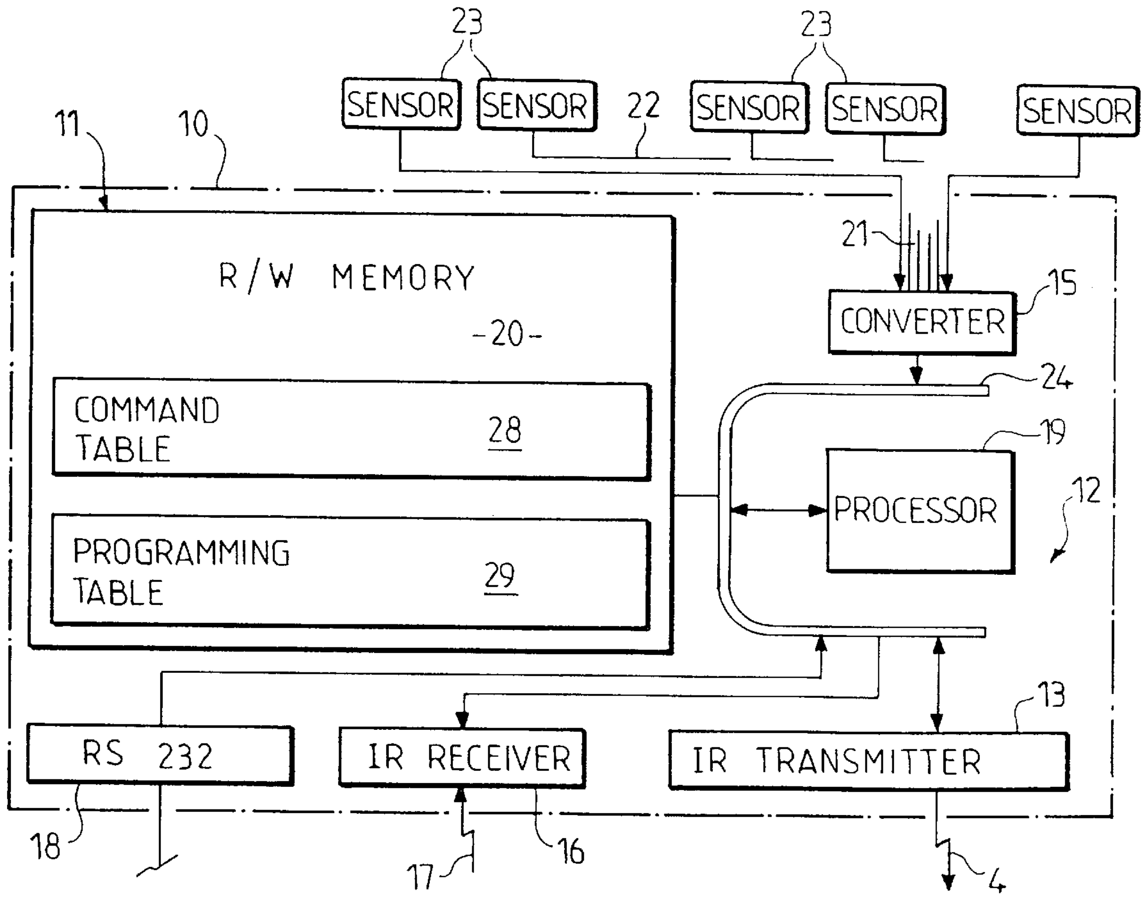
FIG. 2 is a block diagram of a device according to the embodiment of the invention more particularly described here.
Figure 3:
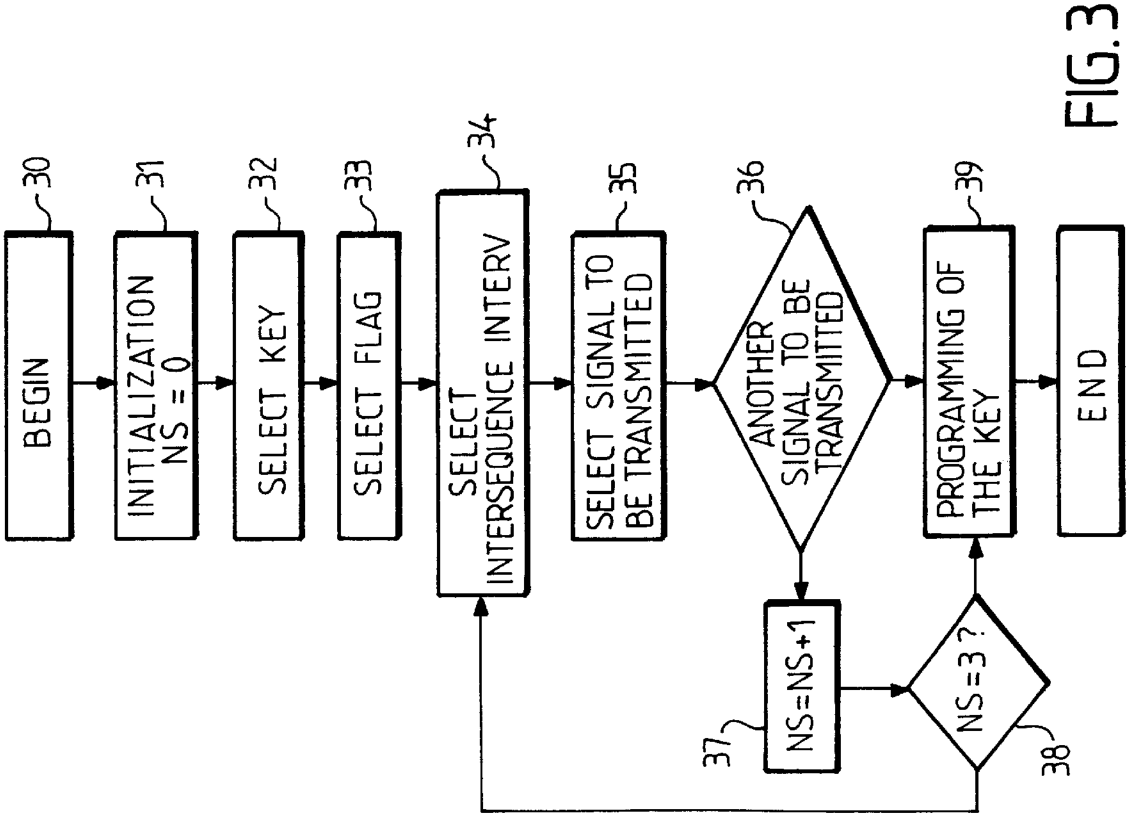
FIG. 3 is a flowchart for programming a sensor belonging to the device according to the invention.

The programming of the device 1 according to the embodiment of the invention more particularly described here will now be described with reference to FIGS. 2, 3 and 4. This programming is performed for example via a microcomputer 14 connected to the serial link 18 of the device 1.

On switching on the device 1, the software implemented by the processing means analyzes the state of the inputs 21 corresponding to the sensors and performs the associated processing operations depending on the values contained in the command table 28 and programming table 29 which will be detailed below.

The command table 28 includes, for example, 48 records. These records can equally well be infrared signals or character strings.

In the embodiment described, each record is composed of 24 bytes.

The first byte represents the nature of the signal recorded. This byte has the value 0 for an ASCII character string and N ($0<N<24$) for an infrared signal, N representing the number of bytes required to code the signal.

In the case in which the first byte is equal to 0, the succeeding bytes correspond to an ASCII character string to be transmitted over the serial link.

In the case of an infrared signal to be transmitted (means 13), the succeeding bytes correspond to the ASCII coding of the signal.

A command table can, for example, contain the following values:

| table entry | type of signal | signal |
|---|---|---|
| 1 | 0 | "string number 1" |
| 2 | 8 | 24 22 22 55 55 55 48 2F |
| 3 | 0 | "string number 2" |
| 4 | 0 | "string number 3" |
| 5 | 11 | 94 22 22 48 98 32 44 48 32 32 4F |

The ASCII coding of an infrared signal is represented by a sequence of bytes indicating the times of infrared transmission. For example, the byte "94" indicates an infrared transmission time of 9×N ms with a gap of 4×N ms before processing the next byte.

The programming table 29 includes, for example, 48 records.

Here, in the embodiment described, each record is composed of 6 bytes.

The first byte corresponds to the input 21 of the sensor N (0<N≦12).

The second byte corresponds to a "flag" field allowing the programming of conditional actions. If this byte is equal to 0 then the sequence for programming the succeeding bytes is executed immediately; if this byte is greater than 0 then this value is compared with those present in the table entries comprising the programming of the flags and the corresponding sequence is then executed immediately.

The succeeding bytes are coded in groups of 2 bytes:

the first byte corresponds to an interval of X sec (0≦X≦128), the second byte corresponds to the entry in the command table corresponding to the signal to be transmitted.

A programming table can, for example, contain the following values:

| table entry | input | Flag | interv1 | signal1 | interv2 | signal2 . . . |
|---|---|---|---|---|---|---|
| 1 | 1 | 0 | 4 | 1 | 6 | 0 |
| 2 | 3 | 1 | 0 | 4 | 0 | 1 |
| 3 | 3 | 2 | 0 | 5 | 0 | 1 |
| 4 | 8 | 0 | 0 | 8 | 0 | 0 |

By way of example, the programming of a key is described below while referring to FIG. 3.

After the begin step 30 and the initialization step 31, the key to be programmed is selected at 32, the "Flag" is selected if appropriate at 33, then the intersequence gap at 34 (the gap specifies the number of seconds to wait before transmitting the IR signal or the character string), and then the signal to be transmitted is selected (step 35) by indicating its index in the command table. At 36 there is a test of whether another signal should be transmitted. In the affirmative (step 37) and if the number of signals to be transmitted Ns is less than n (test 38) the operation is repeated, otherwise the key is programmed at 39. In the mode described here, the number n is taken equal to 3.

The essential commands employed during programming will now be described. Each command is composed of a prefix followed by optional programming parameters followed by a carriage return.

Figure 4:
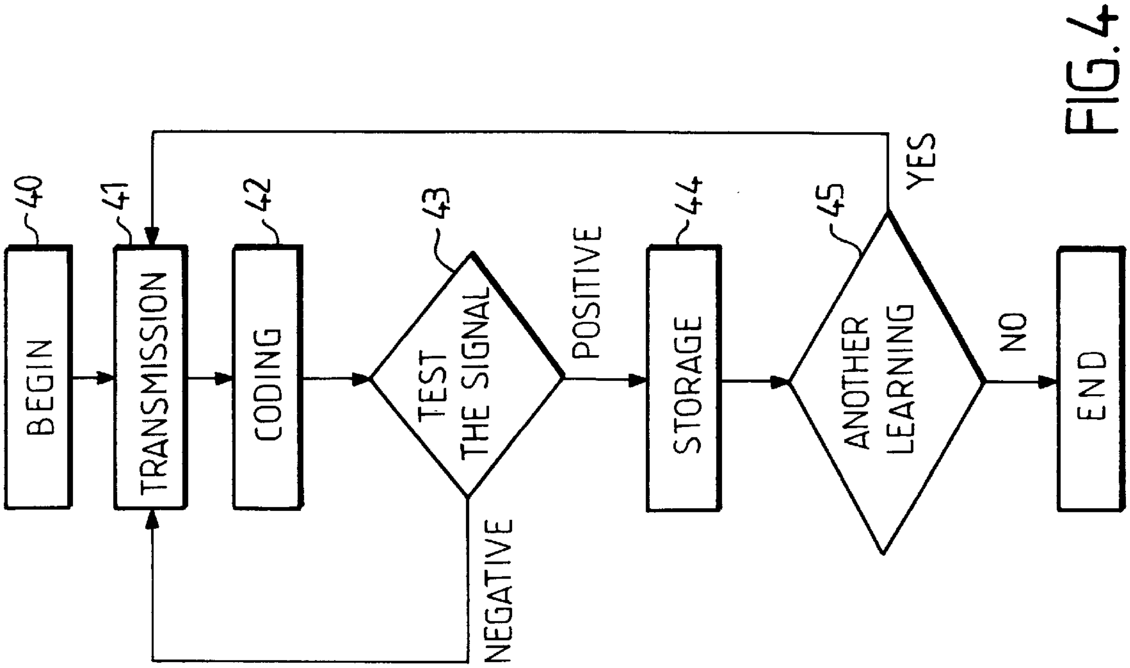
FIG. 4 is a flowchart for coding an infrared signal into ASCII characters, which is used with the method according to the invention.

We firstly detail the commands for the infrared interface while describing the acquisition of an infrared sequence with reference to FIG. 4.

LIR<carriage return>

The device 1 is set into the phase for detecting an infrared sequence (step 40).

Having detected a sequence (step 41), the latter is coded and retransmitted (step 42) to the serial port as follows:

<number of data>< ><hexadecimal data><carriage return>

The signal received is tested at 43. If the result is positive, the signal is stored (step 44) in read/write memory 20. The term positive means the correct restoring by the device of the signal received.

If appropriate, the operation is repeated (step 45).

The testing of an infrared sequence (step 43) is performed via the following command:

TIR<carriage return>

On receiving the <carriage return> the device transmits the infrared sequence corresponding to the coded data.

In the embodiment more particularly described here, memory storage of an infrared sequence in the command table is obtained as follows:

MIR<table entry><carriage return> for example,

LIR,

11 94 22 22 48 98 32 44 48 32 32 4F

MIR 1 implies that the infrared signal sequence:

11 94 22 22 48 98 32 44 48 32 32 4F is stored in entry 1 of the command table.

We now describe the writing of data to the command table.

The above is done in the form of a character string, as follows:

CMD< ><table entry>< ><type of signal>< ><data>< ><carriage return> for example,

CMD 1 0 string number 1 implies that the character string: "string number 1" is stored in entry 1 of the command table or else,

CMD 5 11 94 22 22 48 98 32 44 48 32 32 4F implies that the infrared signal coded as follows:

94 22 22 48 98 32 44 48 32 32 4F is stored in entry 5 of the command table.

In regard to the writing data to the programming table, this is done, for example, in the form of a character string, as follows:

PRG< ><table entry>< ><SENSOR>< ><Flag>< ><program><carriage return> i.e., for example,

PRG 2 3 1 0 4 0 1 implies that the following instructions are stored in entry 2 of the programming table:

If the Flag is equal to 1, the transmission of the signal stored at entry 4 of the command table and then the transmission of the signal stored at entry 1 of the command table is associated with the sensor of input number 3 of the device.

The operation of the device 1 according to the invention will now be described with references to FIG. 1.

The infrared signals for controlling the projector 5 are firstly coded into ASCII with the microcomputer 14. For example, if the projector is one in which all the commands for access to a slide are composed of digits from 0 to 9, then a hexadecimal coding is chosen composed of bytes which are sufficiently distinct for the projector to be able to operate reliably.

Having performed the coding, several cycles of slides are programmed in the same way and the IR signals and the command instructions are loaded directly, in the form of character strings, into the same memory 20 via the link 10.

The operator 2 next programs the keys depending on the instructions as described above.

On the apparatus 5 side, there is provision for an IR receiver 9, which in this instance is a device similar to the device 1, whose serial link is connected to the projector.

The receiver 9 includes means for sensing the infrared radiation 4 emitted by device 1 and coding the sensed infrared radiation.

The signals received and coded then become the commands for the projector.

When the operator presses a key, he thus remotely controls, in an extremely simple, reliable and interactive way, a slide show with synchronized sound, of, for example, several tens of slides.

I claim:

1. A device for remotely interfacing between a user and a programmable apparatus by infrared radiation signals, the device comprising:

programming means for inputting instructions into a box, a plurality of individual sensors located at a distance from said box, the sensors being removably connected by cable link and have actuating means comprising trigger means, actuatable by a user to produce operating signals for operating said programmable apparatus, said box comprising:

means for communicating with said programming means comprising one of a signal reception means and a serial link;

a plurality of connection inputs connected to said plurality of individual sensors;

a data storage means for storing data;

means for remote control of said programmable apparatus comprising:

means for processing said instructions stored in said data storage means comprising:

means for coding said instructions into ASCII signals and storing said coded instructions in said data storage means;

means for processing said coded instructions and said operating signals to generate driving signals;

means for receiving said driving signals and transmitting infrared radiation information corresponding to said driving signals to operate said programmable apparatus.

2. The device according to claim 1, wherein the sensors comprise capacitive keys.

3. The device according to claim 1, wherein the sensors and the means for processing said stored data are configured to control the transmission of ASCII signals via the serial link.

4. The device according to claim 1, wherein the means for storing data are configured to have the data in the form of character strings, such that the totality of instructions for remote control of the apparatus by the device is stored in a single read/write memory.

5. The device according to claim 1, wherein at least one sensor is configured to trigger different transmissions of infrared signals depending on the previous action of the user on one or more other keys.

6. The device according to claim 1, wherein at least one key is configured sa as, after having been actuated a first time, to trigger regularly a sequence of events in accordance with a predetermined interval.

7. An interactive system of communication, comprising at least two devices according to claim 1, which are configured to interact with one another.

8. The system according to claim 7, wherein at least one same sensor is connected respectively to two devices.

9. The device according to claim 1 further comprising initializing means for configuring said connection inputs as output ports and means for activating said output ports in order to carry out said application with the apparatus.

10. The device according to claim 9, wherein at least two sensors are connected in parallel to the same connection input.

11. A method of communication between a user and a remotely controllable apparatus by using infrared radiation signals via a programmable interfacing device comprising a box having a memory and a plurality of individual sensors removably connected thereto and located at a distance from said box, the method comprising the steps of:

programming said interfacing device with ASCII signals corresponding to infrared radiation signals for operating said remotely controllable apparatus;

storing said ASCII signals in said memory;

associating operating instructions for said remotely controllable apparatus with each sensor; and controlling said transmission of said infrared radiation information by the device via one or more actions by the user on one or more of said sensors, so that the apparatus carries out said operating instructions.

12. The method according to claim 11, wherein the infrared radiation information and instructions data for control of the apparatus are stored in the form of character strings, the totality of an application being stored in one and the same read/write memory.

13. The method according to claim 11, wherein the application is loaded into the device by CD-I, videodisc, CD-audio or video signal.

14. A method of communication according to claim 11, between at least two devices.

* * * * *